United States Patent
Shirakyan et al.

(10) Patent No.: US 10,062,180 B2
(45) Date of Patent: Aug. 28, 2018

(54) DEPTH SENSOR CALIBRATION AND PER-PIXEL CORRECTION

(71) Applicant: Microsoft Corporation, Redmond, WA (US)

(72) Inventors: Grigor Shirakyan, Kirkland, WA (US); Michael Revow, Bellevue, WA (US); Mihai Jalobeanu, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 565 days.

(21) Appl. No.: 14/258,097

(22) Filed: Apr. 22, 2014

(65) Prior Publication Data

US 2015/0302570 A1    Oct. 22, 2015

(51) Int. Cl.
| | |
|---|---|
| *G06T 7/80* | (2017.01) |
| *G01S 7/497* | (2006.01) |
| *G06T 5/00* | (2006.01) |
| *G01S 17/08* | (2006.01) |
| *G01S 17/89* | (2006.01) |
| *G06T 7/50* | (2017.01) |

(52) U.S. Cl.
CPC .............. *G06T 7/85* (2017.01); *G01S 7/497* (2013.01); *G01S 17/08* (2013.01); *G01S 17/89* (2013.01); *G06T 5/001* (2013.01); *G06T 7/50* (2017.01); *G06T 7/80* (2017.01); *G06T 2207/10028* (2013.01); *G06T 2207/20021* (2013.01); *G06T 2207/30252* (2013.01)

(58) Field of Classification Search
CPC .............................. H04N 13/0246; G06T 7/85
See application file for complete search history.

(56) References Cited

U.S. PATENT DOCUMENTS

| | | | |
|---|---|---|---|
| 8,339,582 B2 | 12/2012 | Shim et al. | |
| 2011/0254923 A1 | 10/2011 | Choi et al. | |
| 2012/0105585 A1 | 5/2012 | Masalkar et al. | |
| 2012/0162414 A1* | 6/2012 | Zhang | G01C 25/00 348/139 |

(Continued)

OTHER PUBLICATIONS

S. Fuchs & S. May, "Calibration and Registration for Precise Surface Reconstruction with TOF Cameras" (Year: 2007).*

(Continued)

*Primary Examiner* — David N Werner
(74) *Attorney, Agent, or Firm* — Medley, Behrens & Lewis, LLC

(57) ABSTRACT

Various technologies described herein pertain to correction of an input depth image captured by a depth sensor. The input depth image can include pixels, and the pixels can have respective depth values in the input depth image. Moreover, per-pixel correction values for the pixels can be determined utilizing depth calibration data for a non-linear error model calibrated for the depth sensor. The per-pixel correction values can be determined based on portions of the depth calibration data respectively corresponding to the pixels and the depth values. The per-pixel correction values can be applied to the depth values to generate a corrected depth image. Further, the corrected depth image can be output.

20 Claims, 10 Drawing Sheets

(56) References Cited

U.S. PATENT DOCUMENTS

2012/0229628 A1    9/2012  Ishiyama et al.
2015/0381964 A1*  12/2015  Drouot .................. H04N 5/247
                                                    348/47

OTHER PUBLICATIONS

J. Zhu, L. Wang, R. Yang, & J. Davis, "Fusion of Time-of-Flight Depth and Stereo for High Accuracy Depth Maps" (Year: 2008).*
"Written Opinion of the International Preliminary Examining Authority for PCT Application No. PCT/US2015/024596", dated Apr. 1, 2016, 6 Pages.
Lo, et al., "SIFT Keypoint Descriptors for Range Image Analysis", In Annuals of the BMVA, vol. 2008, No. 3, 2008, pp. 1-17.
Yamazoe, et al., "Easy Depth Sensor Calibration", Retrieved at: «http://ieeexplore.ieee.org/stamp/stamp.jsp?tp=&arnumber=6460172», In Proceedings of 21st International Conference on Pattern Recognition, Nov. 11, 2012, 4 pages.
Zhu, et al., "Reliability Fusion of Time-of-Flight Depth and Stereo Geometry for High Quality Depth Maps", Retrieved at: «http://ieeexplore.ieee.org/stamp/stamp.jsp?tp=&arnumber=5567112», In IEEE Transactions on Pattern Analysis and Machine Intelligence, vol. 33, Issue 7, Jul. 2011, 15 pages.
Kim, et al., "Depth Data Calibration and Enhancement of Time-of-Flight Video-Plus-Depth Camera", Retrieved at: «http://ieeexplore.ieee.org/stamp/stamp.jsp?tp=&arnumber=6476812», In Proceedings of Future of Instrumentation International Workshop, Nov. 7, 2011, 4 pages.
Lindner, et al., "Lateral and Depth Calibration of PMD-Distance Sensors", Retrieved at: «http://www.cg.informatik.uni-siegen.de/data/Publications/2006/isvc2006.pdf», In Proceedings of the Second International Conference on Advances in Visual Computing, Nov. 6, 2006, 10 pages.
Raposo, et al., "Fast and Accurate Calibration of a Kinect Sensor", Retrieved at: «http://arthronav.isr.uc.pt/~carolina/files/IEEE3DV_2013.pdf», In Proceedings of International Conference on 3DV-Conference, Jun. 29, 2013, 8 pages.
Teichman, et al., "Unsupervised Intrinsic Calibration of Depth Sensors via SLAM", Retrieved at: «http://www.roboticsproceedings.org/rss09/p27.pdf», In Proceedings of Robotics: Science and Systems, Jun. 2013, 8 pages.
Konolige, et al., "Technical Description of Kinect Calibration", Retrieved on: Jan. 7, 2014 Retrieved at: «http://wiki.ros.org/kinect_calibration/technical», 8 pages.
"Response to the Written Opinion of the International Searching Authority for PCT Application No. PCT/US2015/024596", Filed Date: Oct. 28, 2015, 12 Pages.
"International Search Report and Written Opinion Issued in PCT Application No. PCT/US2015/024596", dated Aug. 13, 2015, 8 Pages.
Shim, et al., "Time-of-Flight Sensor and Color Camera Calibration for Multi-View Acquisition", In The Visual Computer, vol. 28, Issue 12, Dec. 28, 2011, pp. 1139-1151.
"International Preliminary Report on Patentability for PCT Application No. PCT/US2015/024596", dated Jul. 29, 2016, 19 Pages.
"Office Action Response for European Application No. 15719335.0", Filed Date: May 17, 2017, 16 Pages.

* cited by examiner

DEPTH SENSOR CALIBRATION AND PER-PIXEL CORRECTION

BACKGROUND

Use of image sensors has recently become more widespread. Various techniques for custom calibration of intrinsic parameters of image sensors after manufacturing are commonly employed. Examples of the intrinsic parameters that are conventionally calibrated after manufacturing of the image sensor include focal lengths, lens distortions, offsets of optical axis centers, and so forth. Further, correction based on the calibration of the intrinsic parameters can be applied in real-time as the image sensor produces readings.

While various conventional approaches tend to calibrate the intrinsic parameters of the image sensors, conventional approaches oftentimes do not adequately address depth reading biases. Thus, depth sensors, many of which have limited accuracy upon leaving the factory floor, commonly report incorrect distances to objects as compared to distances to such objects measured by a precision distance measurement instrument (e.g., a laser range finder).

Depth sensors are commonly included in vision systems used for various applications that employ distances to objects on a scene. For example, depth sensors can be utilized to navigate in an indoor environment or manipulate objects on a tabletop. Depth sensors typically have limited accuracy when leaving the factory floor, which can be due to a combination of hardware capabilities and traditional calibration techniques for the depth sensors. For instance, many depth sensors are commonly calibrated on a per-sensor basis as part of the manufacturing process. The low level of accuracy commonly resulting from such conventional calibration techniques can be detrimental to overall system performance for applications that utilize the distances detected by the depth sensors, such as two-dimensional (2D) and three-dimensional (3D) scene reconstruction, 3D scanning, scene segmentation, robot navigation and manipulation, amongst others.

SUMMARY

Described herein are various technologies that pertain to correction of an input depth image captured by a depth sensor. The input depth image can include pixels, and the pixels can have respective depth values in the input depth image. Moreover, per-pixel correction values for the pixels can be determined utilizing depth calibration data for a non-linear error model calibrated for the depth sensor. The per-pixel correction values can be determined based on portions of the depth calibration data respectively corresponding to the pixels and the depth values. The per-pixel correction values can be applied to the depth values to generate a corrected depth image. Further, the corrected depth image can be output.

In accordance with various embodiments, the depth calibration data for the non-linear error model calibrated for the depth sensor can include a parameter matrix, and the parameter matrix can include error fitting parameters for the pixels. Thus, for each pixel of the input depth image, error fitting parameters from the parameter matrix for a pixel can be utilized to compute a per-pixel correction value when evaluating a non-linear error function. According to other embodiments, the depth calibration data for the non-linear error model calibrated for the depth sensor can include a lookup table that includes predefined correction values at preset depth values for the pixels.

In accordance with various embodiments, pluralities of the pixels of the input depth image that form respective patches can be identified. The patches can be assigned respective subsets of the depth calibration data. For instance, a plurality of the pixels included in a given patch can share a corresponding subset of the depth calibration data. Thus, the per-pixel correction values can be determined based on the subsets of the depth calibration data respectively corresponding to the pixels and the depth values.

Further, various embodiments set forth herein pertain to calibration of a depth sensor. Depth images of a surface captured by the depth sensor can be received. Subsets of the depth images of the surface can be captured at respective distances from the surface. Moreover, the depth images each include pixels, where the pixels have respective depth values in each of the depth images. Respective ground truth measurements to the surface corresponding to the subsets of the depth images can also be received. The ground truth measurements can be measured by a distance measurement device. The depth values of the pixels can be averaged over the depth images in each of the subsets of the depth images captured at the respective distances from the surface. Further, averaged depth values of the pixels can be compared to the ground truth measurements to compute error values for the pixels at each of the respective distances from the surface. Moreover, depth calibration data can be generated for a non-linear error model calibrated for the depth sensor based upon the error values for the pixels at each of the respective distances from the surface and the ground truth measurements.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
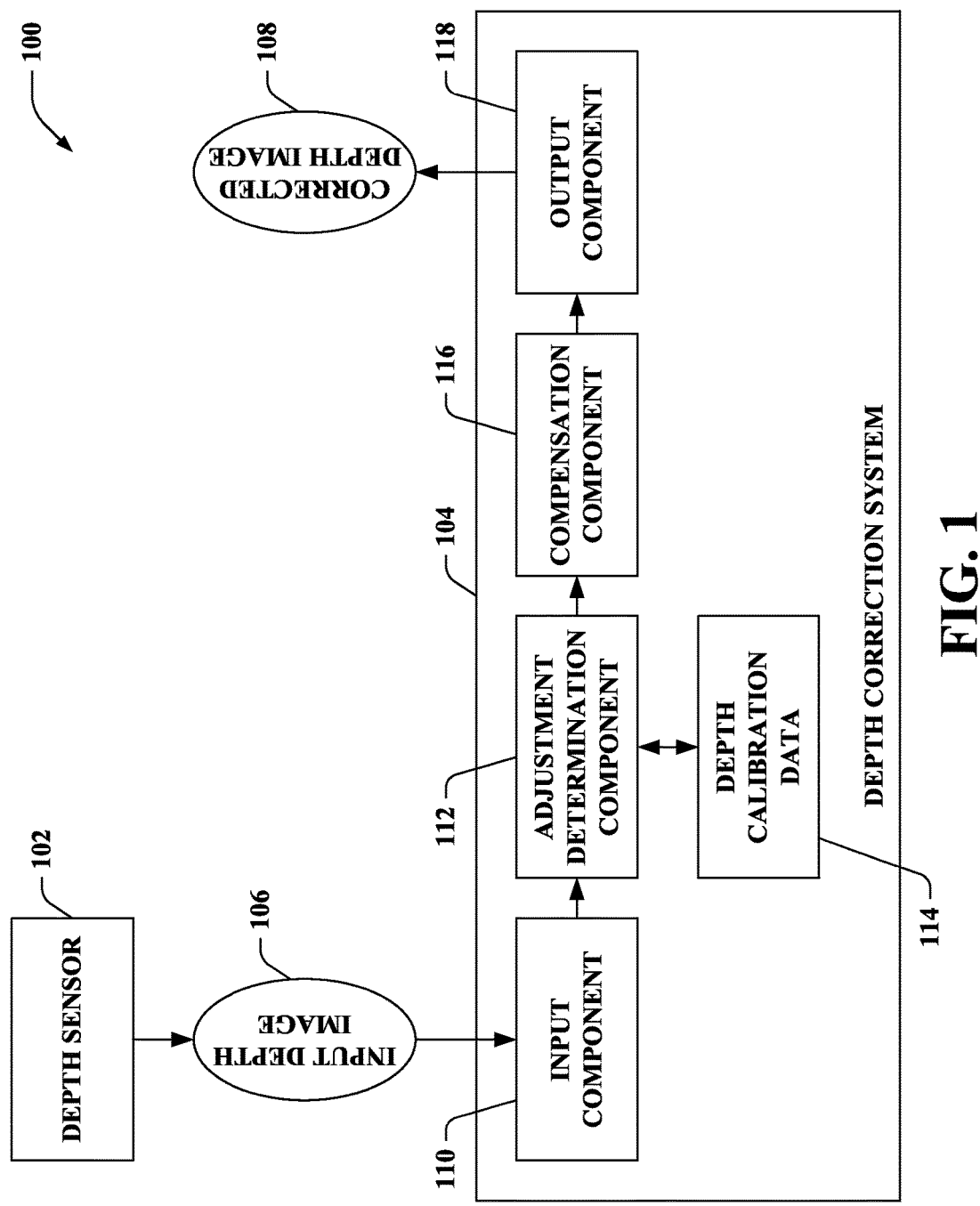
FIG. 1 illustrates a functional block diagram of an exemplary system that corrects input depth images generated by a depth sensor.

Various technologies pertaining to depth sensor calibration and per-pixel correction of depth images captured by the depth sensor are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that corrects input depth images generated by a depth sensor 102. The system 100 includes the depth sensor 102 and a depth correction system 104. The depth sensor 102 can capture an input depth image 106. The input depth image 106 includes pixels, and the pixels have respective depth values in the input depth image 106. The input depth image 106 captured by the depth sensor 102 can be provided to the depth correction system 104. The depth correction system 104 can correct depth values in the input depth image 106 captured by the depth sensor 102 to generate a corrected depth image 108. Thus, at runtime as the depth sensor 102 produces input depth images (e.g., depth frames), the depth correction system 104 can apply per-pixel correction of the depth values in the input depth images reported by the depth sensor 102.

Various types of depth sensors are intended to fall within the scope of the hereto appended claims. For example, the depth sensor 102 can be a structured-light 3D scanner, a time-of-flight scanner, a modulated light 3D scanner, or the like. For instance, a structured-light 3D scanner can project a pattern of light on a scene, capture a snapshot of the light, and analyze distortion of the pattern to determine the depth values of the pixels in the input depth image 106.

The depth correction system 104 includes an input component 110 that receives the input depth image 106 captured by the depth sensor 102. For example, the input component 110 can receive the input depth image 106 responsive to the input depth image 106 being captured by the depth sensor 102 (e.g., the depth sensor 102 can send a stream of input depth images to the depth correction system 104). According to another example, the input component 110 can receive a batch of input depth images (including the input depth image 106) (e.g., the depth sensor 102 can collect and send the batch of input depth images). While many of the examples set forth herein describe the input depth image 106, it is to be appreciated that such examples can be extended to other input depth images captured by the depth sensor 102.

In accordance with an example, the input component 110 can receive the input depth image 106 directly from the depth sensor 102. Pursuant to an illustration of this example, a computing device can include the depth correction system 104, and such computing device can be coupled with or include the depth sensor 102. According to another example, the input component 110 can receive the input depth image 106 captured by the depth sensor 102 from a disparate node in network (not shown). By way of illustration, a server computing device (or server computing devices) can include the depth correction system 104.

The depth correction system 104 further includes an adjustment determination component 112 that determines per-pixel correction values for the pixels utilizing depth calibration data 114 for a non-linear error model calibrated for the depth sensor 102. The per-pixel correction values are determined by the adjustment determination component 112 based on portions of the depth calibration data 114 respectively corresponding to the pixels. The adjustment determination component 112 further determines the per-pixel correction values based on the depth values in the input depth image 106.

Moreover, the depth correction system 104 includes a compensation component 116 that applies the per-pixel correction values to the depth values to generate the corrected depth image 108. For instance, the compensation component 116 can subtract the per-pixel correction values from the corresponding depth values to produce the corrected depth image 108. The corrected depth image 108 can further be outputted by an output component 118 of the depth correction system 104. The output component 118, for example, can cause the corrected depth image 108 to be displayed on a display screen, retained in a data store, transmitted to a disparate computing device (or computing devices), a combination thereof, and so forth.

Thus, at runtime responsive to the input depth image 106 being produced by the depth sensor 102, the adjustment determination component 112 can compute the per-pixel correction values (e.g., errors for each pixel in the input depth image 106) based upon the reported depth values of the pixels. Moreover, the compensation component 116 can subtract the per-pixel correction values from the corresponding depth values (e.g., the per-pixel errors can be subtracted from the raw readings from the input depth image 106). Accordingly, the depth correction system 104 can compensate for systemic biases (negative and/or positive).

According to various embodiments, the depth calibration data 114 for the non-linear error model calibrated for the depth sensor 102 can include a parameter matrix, and the parameter matrix can include error fitting parameters for the pixels. Thus, the adjustment determination component 112 can determine the per-pixel correction values utilizing the parameter matrix. More particularly, the adjustment determination component 112 can retrieve error fitting parameters for a pixel from the parameter matrix, where the pixel has a depth value in the input depth image 106. Moreover, the adjustment determination component 112 can compute a per-pixel correction value for the pixel by evaluating a non-linear error function using the error fitting parameters for the pixel. The non-linear error function can be evaluated by the adjustment determination component 112 for the input depth image 106 based on the depth value. The foregoing can be performed by the adjustment determination component 112 for each of the pixels of the input depth image 106.

According to an example where the depth calibration data 114 includes the parameter matrix, the non-linear error function can be a second-degree polynomial such as: Error=$Ax^2+Bx+C$. In the foregoing, x is a depth value for a given pixel in the input depth image 106, and A, B, and C are the error fitting parameters for the given pixel from the parameter matrix. However, it is to be appreciated that other non-linear error functions (e.g., trigonometric function, etc.) that can be evaluated by the adjustment determination component 112 using error fitting parameters from the parameter matrix are intended to fall within the scope of the hereto appended claims.

According to other embodiments, the depth calibration data 114 for the non-linear error model calibrated for the depth sensor 102 can include a lookup table. The lookup table can include predefined correction values at preset depth values for the pixels. The adjustment determination component 112 can determine the per-pixel correction values utilizing the lookup table. More particularly, the adjustment determination component 112 can retrieve a first predefined correction value at a first preset depth value for a pixel from the lookup table, where the pixel has a depth value in the input depth image 106. Moreover, the first preset depth value can be equal to or immediately greater than the depth value for the pixel in the lookup table. Further, the adjustment determination component 112 can retrieve a second predefined correction value at a second preset depth value for the pixel in the lookup table. The second preset depth value can be immediately less than the depth value for the pixel in the lookup table. The adjustment determination component 112 can determine a per-pixel correction value for the pixel having the depth value based upon linear interpolation between the first predefined correction value at the first preset depth value and the second predefined correction value at the second preset depth value. Again, the foregoing can be performed by the adjustment determination component 112 for each of the pixels of the input depth image 106.

The depth calibration data 114 can include subsets of data calibrated per-pixel or per-patch, where a patch includes a plurality of pixels. By way of illustration where the depth calibration data 114 is calibrated per-pixel, the depth calibration data 114 can include a first subset of data calibrated for a first pixel, a second subset of data calibrated for a second pixel, and so forth. Pursuant to another illustration where the depth calibration data 114 is calibrated per-patch, the depth calibration data 114 can include a first subset of data calibrated for a first patch (e.g., a first plurality of pixels), a second subset of data calibrated for a second patch (e.g., a second plurality of pixels), and so forth.

According to various embodiments, the depth calibration data 114 can include subsets of data calibrated per-patch. Accordingly, the adjustment determination component 112 can identify pluralities of the pixels of the input depth image 106 that form respective patches. The patches can be assigned respective subsets of the depth calibration data 114. Further, a plurality of the pixels included in a patch can share a subset of the depth calibration data 114. Moreover, the adjustment determination component 112 can determine the per-pixel correction values based on the subsets of the depth calibration data 114 respectively corresponding to the pixels and the depth values.

By way of illustration, the depth calibration data 114 for the non-linear error model calibrated for the depth sensor 102 can include the parameter matrix and the depth calibration data 114 can include subsets of data calibrated per-patch. Following this illustration, the input depth image 106 can include a plurality of patches (e.g., as identified by the adjustment determination component 112) that include respective pluralities of the pixels of the input depth image 106. Moreover, the patches can be assigned respective error fitting parameters of the parameter matrix. Thus, a plurality of the pixels included in a given patch can share error fitting parameters assigned to the patch.

It is contemplated that the patches can have substantially any shape and size. For instance, the patches may be square or rectangular; however, other shapes are intended to fall within the scope of the hereto appended claims. According to various examples where the patches have square shapes, the patches can be 8×8 (e.g., 8 pixels wide by 8 pixels high) or 20×20; however, other sizes of patches are intended to fall within the scope of the hereto appended claims.

Pursuant to a further example, each of the patches can be a preset fraction of the input depth image 106. Following this example, the preset fraction of the input depth image can be independent of a resolution of the input depth image 106 captured by the depth sensor 102. Thus, the depth calibration data 114 can be resolution-agnostic. Accordingly, rather than measuring the size of a patch in pixels, a patch can be a preset fraction of a frame resolution (e.g., a width of a square patch can be $\frac{1}{40}$th of a width of the input depth image 106 and a height of a square patch can be $\frac{1}{30}$th of a height of the input depth image 106) with a designated area of applicability (e.g., the patch is applied to pixels in a given area of the input depth image 106). Following this example, the patch can be defined in relative terms as opposed to absolute terms.

It is contemplated that a computing device (or plurality of computing devices) can include the depth correction system 104. By way of illustration, the depth correction system 104 can be executed by a processor or a graphics processing unit (GPU) of the computing device. According to various examples, the depth calibration data 114 can be retained in a data store of the computing device, firmware of the computing device, or the like. Moreover, substantially any type of computing device is intended to fall within the scope of the hereto appended claims (e.g., personal computers, mobile computing devices, server computing devices, gaming consoles, embedded computing devices included in robots, vehicles, cameras, televisions, or the like, etc.).

Figure 2:
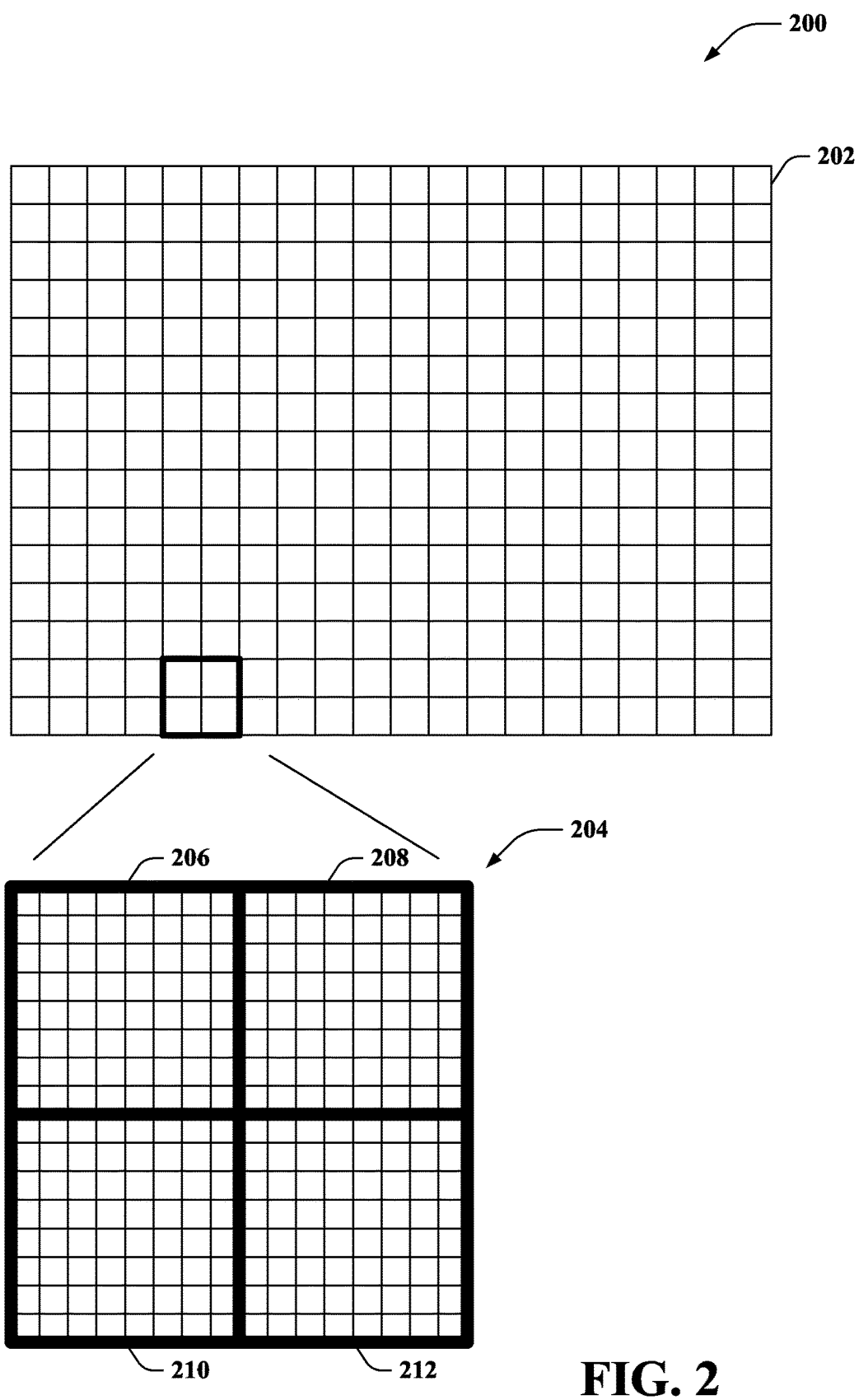
FIG. 2 illustrates an exemplary depth image.

Turning to FIG. 2, illustrated is an exemplary depth image 200 (e.g., depth frame). The depth image 200 can be the input depth image 106 of FIG. 1. Moreover, a plurality of patches (including a patch 202) that include respective pluralities of pixels of the depth image 200 can be identified for the depth image 200. The depicted example of FIG. 2 shows the depth image 200 including square-shaped patches; however, it is contemplated that other shapes of patches are intended to fall within the scope of the hereto appended claims. The claimed subject matter also is not limited to the number of patches, the resolution of the depth image 200, or the aspect ratio of the depth image 200 shown in the illustrated example of FIG. 2.

According to various embodiments, the patches can include respective predetermined pluralities of pixels of the depth image 200. In other embodiments, the patches can be preset fractions of the depth image 200, each at a respective designated area within the depth image 200. Thus, for instance, the patch 202 can be $\frac{1}{20}$th of the width of the depth image 200, $\frac{1}{15}$th of the height of the depth image 200, and located at an upper right-hand corner of the depth image 200.

As illustrated in FIG. 2, a section 204 of the depth image 200 is shown in an exploded view. In the section 204, four patches are depicted, namely, a patch 206, a patch 208, a patch 210, and a patch 212. As illustrated in FIG. 2, each of the patches 206-212 is 8 pixels wide by 8 pixels high. However, again it is noted that the patches 206-212 can include other numbers of pixels.

Moreover, each of the patches of the depth image 200 can be assigned a corresponding subset of the depth calibration data 114 of FIG. 1. For instance, pixels included in the patch 206 can share a subset of the depth calibration data 114 assigned to the patch 206. Thus, the subset of the depth calibration data 114 assigned to the patch 206 can be used to determine the per-pixel correction values of the pixels in the patch 206.

Figure 3:
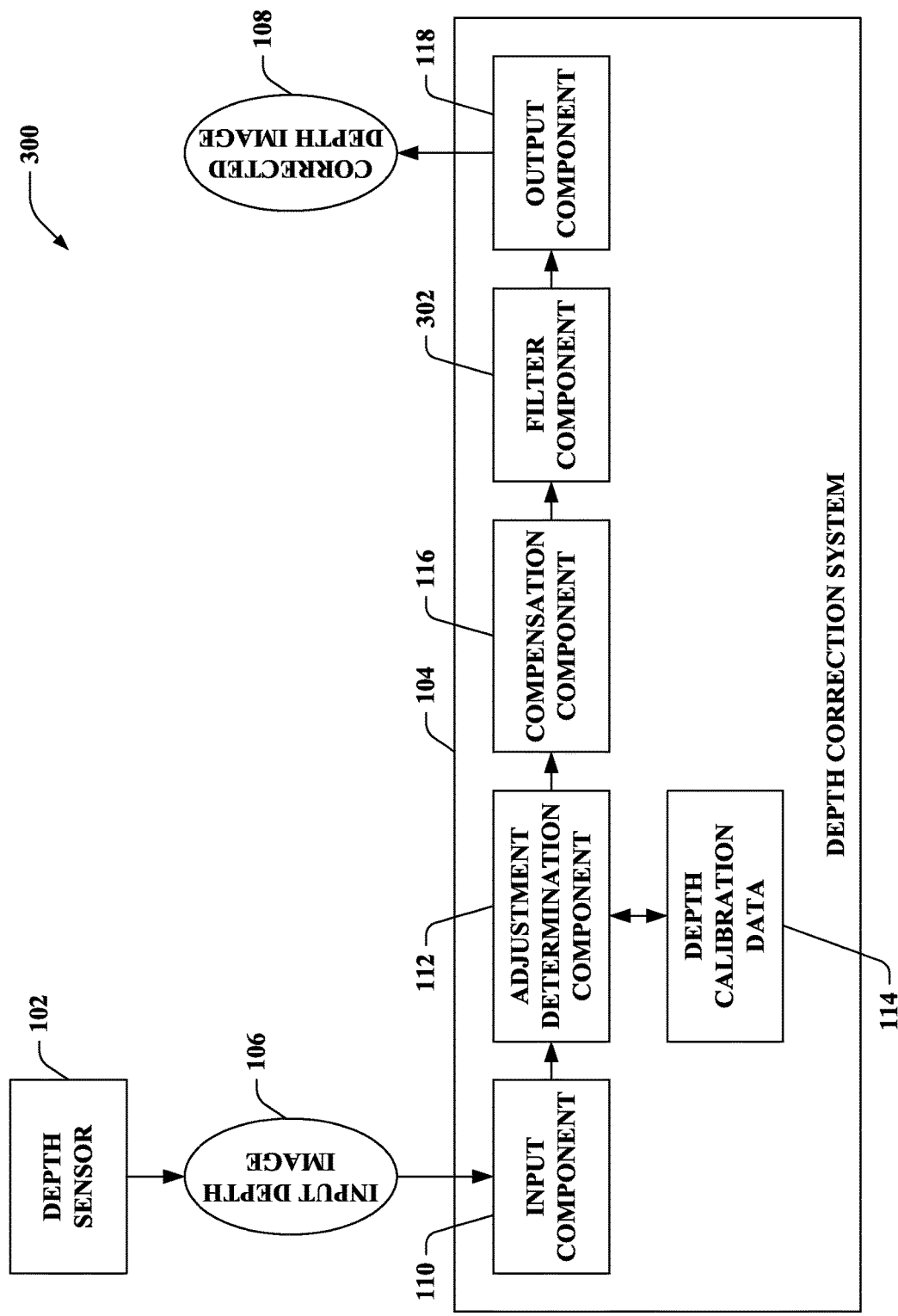
FIG. 3 illustrates a functional block diagram of another exemplary system that corrects depth images captured by the depth sensor.

Turning to FIG. 3, illustrated is another system 300 that corrects depth images captured by the depth sensor 102. The system 300 again includes the depth sensor 102 and the depth correction system 104. Similar to above, the depth correction system 104 can include the input component 110, the adjustment determination component 112, the depth calibration data 114, the compensation component 116, and the output component 118.

More particularly, the input component 110 can receive the input depth image 106 captured by the depth sensor 102. Moreover, the adjustment determination component 112 can determine the per-pixel correction values for the pixels utilizing the depth calibration data 114 for the non-linear error model calibrated for the depth sensor 102. The adjustment determination component 112 can also identify pluralities of the pixels of the input depth image 106 that form respective patches. Further, the patches are assigned respective subsets of the depth calibration data 114. Thus, a plurality of the pixels included in a patch can share a subset of the depth calibration data 114. Moreover, the adjustment determination component 112 can determine the per-pixel correction values based on the subsets of the depth calibration data 114 respectively corresponding to the pixels and the depth values. Accordingly, a subset of the depth calibration data 114 shared by pixels included in a patch can be used by the adjustment determination component 112 to determine the per-pixel correction values for the pixels included in the patch. Further, the compensation component 116 can apply the per-pixel correction values to the depth values to generate the corrected depth image 108.

The depth correction system 104 can further include a filter component 302 that filters the corrected depth image 108 to smooth between the patches. Thus, responsive to the compensation component 116 applying the per-pixel correction values to the depth values, the filter component 302 can filter the corrected depth image 108. Moreover, the output component 118 can output the corrected depth image 108 as filtered. The filter component 302 can employ substantially any type of filtering between the patches. For instance, the filter component 302 can employ bilateral filtering, guided filtering, etc. Such filtering implemented by the filter component 302 can smooth between the patches, thereby mitigating noticeability of artifacts between patches.

Figure 4:
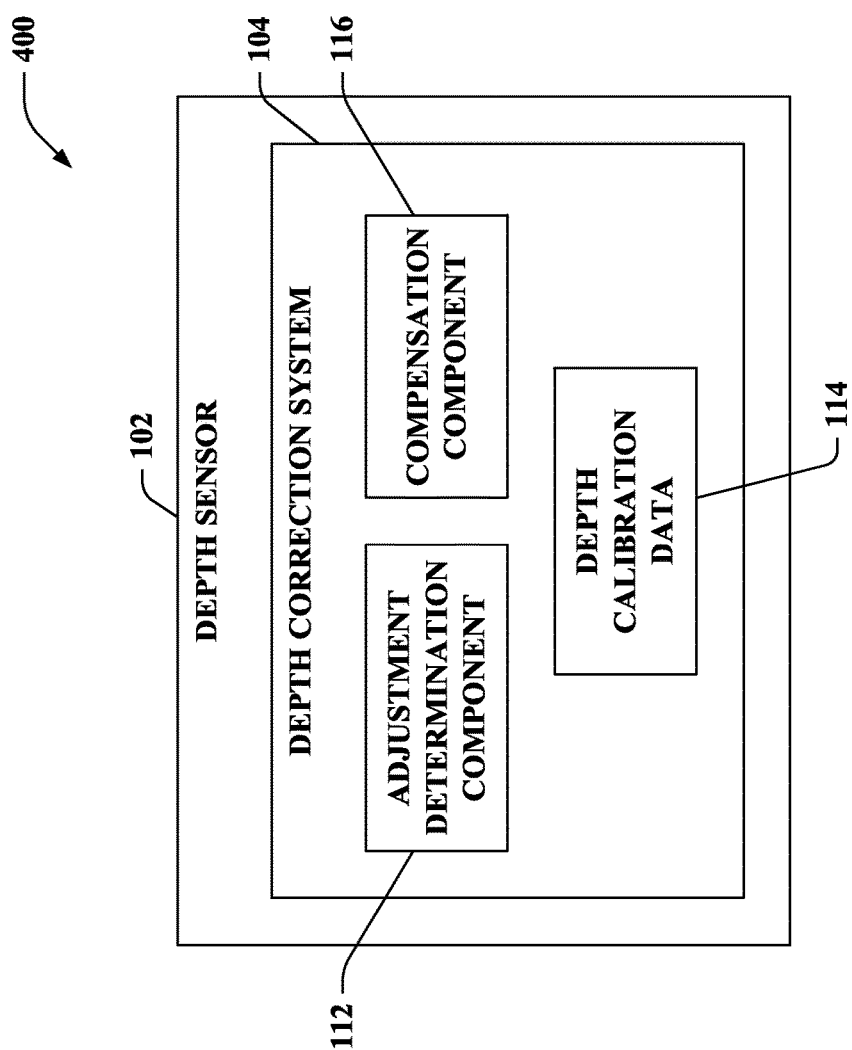
FIG. 4 illustrates a functional block diagram of an exemplary system that includes the depth sensor, where the depth sensor can correct input depth images.

Now turning to FIG. 4, illustrated is a system 400 that includes the depth sensor 102, where the depth sensor 102 can correct input depth images. In the example of FIG. 4, the depth sensor 102 includes the depth correction system 104, which can further include the adjustment determination component 112, the depth calibration data 114, and the compensation component 116. Thus, the depth sensor 102 can use the depth correction system 104 to implement the per-pixel correction of the input depth image captured thereby to generate the corrected depth image.

Figure 5:
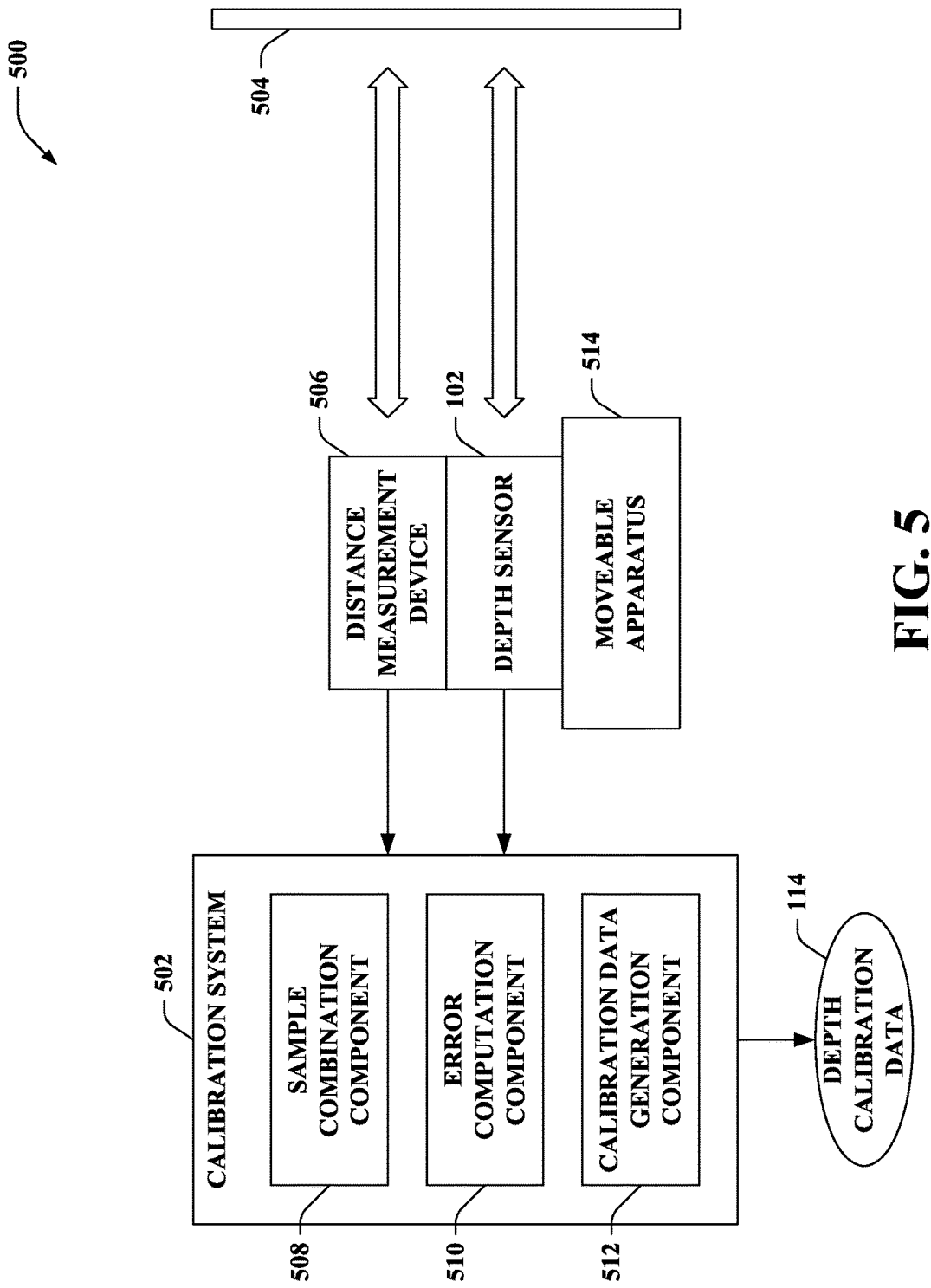
FIG. 5 illustrates a functional block diagram of an exemplary system that calibrates the depth sensor.

With reference to FIG. 5, illustrated is a system 500 that calibrates the depth sensor 102. The system 500 includes a calibration system 502 that generates the depth calibration data 114 for the depth sensor 102 from depth images of a surface 504 captured by the depth sensor 102 and corresponding ground truth measurements to the surface 504 measured by a distance measurement device 506. According to an example, the surface 504 can be a flat wall; however, it is contemplated that the surface 504 can have any known geometry so long as ground truth measurements of distance(s) from a projection plane of the depth sensor 102 to the surface 504 can be directly determined (e.g., the surface 504 can be a floor, etc.).

The distance measurement device 506 measures a distance to the surface 504, where such distance measured by the distance measurement device 506 is treated as a ground truth measurement. The distance measurement device 506, for example, can be a laser range finder; however other types of distance measurement devices are intended to fall within the scope of the hereto appended claims. For example, the distance measurement device 506 can be an internal measurement device and/or sensor (e.g., of the depth sensor 102 or a moveable apparatus 514) that can determine the ground truth measurements. Following this example, the distance measurement device 506 can be an inertial measurement unit (IMU) or a component that employs odometry. Moreover, it is contemplated that the distance measurement device 506 need not directly measure the ground truth measurements, for example.

The calibration system 502 can receive the depth images of the surface 504 captured by the depth sensor 102. Subsets of the depth images of the surface 504 can be captured at respective distances from the surface 504 (e.g., a first subset of the depth images of the surface 504 can be captured at a first distance from the surface 504, a second subset of the depth images of the surface 504 can be captured at a second distance from the surface 504, etc.). Further, the depth images can each include pixels, with the pixels having respective depth values in each of the depth images. The calibration system 502 can further receive respective ground truth measurements to the surface corresponding to the subsets of the depth images (e.g., from the distance measurement device 506).

The calibration system 502 includes a sample combination component 508 that can average the depth values of the pixels over the depth images in each of the subsets captured at the respective distances from the surface 504. By way of illustration, if 100 depth images of the surface 504 captured by the depth sensor 102 at a distance of 50 cm are received by the calibration system 502, then the sample combination component 508 can average the depth values of the pixels over the 100 depth images. Depth images of the surface 504 captured at other distances from the surface 504 can similarly be combined by the sample combination component 508.

Moreover, the calibration system 502 can include an error computation component 510 that compares averaged depth values of the pixels to the ground truth measurements obtained from the distance measurement device 506 to compute error values for the pixels at each of the respective distances from the surface 504. Again referencing the aforementioned illustration where 100 depth images of the surface 504 captured at 50 cm are received and the depth values of the pixels over the 100 depth images are averaged, the error computation component 510 can compare the averaged depth values of the pixels to the ground truth measurement (e.g., the distance measurement device 506 can provide a ground truth measurement of 50 cm for the 100 depth images in this illustration) to compute error values for the pixels at the distance of 50 cm.

The calibration system 502 can further include a calibration data generation component 512 that generates the depth calibration data 114 for the non-linear error model calibrated for the depth sensor 102 based upon the error values for the pixels at each of the respective distances from the surface 504 and the ground truth measurements. According to various embodiments, the depth calibration data 114 for the non-linear error model calibrated for the depth sensor 102 can include a parameter matrix, where the parameter matrix includes error fitting parameters for the pixels. Pursuant to other embodiments, the depth calibration data 114 for the non-linear error model calibrated for the depth sensor 102 can include a lookup table, where the lookup table includes predefined correction values at preset depth values for the pixels.

The system 500 can further include a movable apparatus 514 that can move the depth sensor 102 and the distance measurement device 506 with respect to the surface 504. For example, the movable apparatus 514 can be a movable platform on which the depth sensor 102 and the distance measurement device 506 are mounted. According to another example, the movable apparatus 514 can be a robot that includes the depth sensor 102 and the distance measurement device 506. Yet, the claimed subject matter is not limited to the foregoing examples.

According to various embodiments, the movable apparatus 514 can be programmatically controlled to move autonomously, such that it can move the depth sensor 102 along an axis perpendicular to the surface 504. Further, the movable apparatus 514 can align the depth sensor 102 against the surface 504 (e.g., panning and/or tilting the depth sensor 102). According to an example, the movable apparatus 514 can employ automated discovery of surfaces against which to run calibration (e.g., in an autonomous navigating robot scenario); yet, the claimed subject matter is not limited to such example.

Moreover, it is contemplated that non-flat portions of the surface 504 can be detected and removed from the scene (e.g., bumps on a wall, floor, etc. can be detected and removed). For instance, the calibration system 502 can detect and remove the non-flat portions of the surface 504; yet, the claimed subject matter is not so limited.

For each distance from the surface 504 in a set of distances, the depth sensor 102 can capture more than one depth image of the surface 504 from such distance, which can be provided to the calibration system 502. For instance, T samples can be collected from the depth sensor 102 prior to the movable apparatus 514 moving to a next distance from the surface 504, where T can be substantially any integer (e.g., T can be 100, etc.). Before each measurement, the depth sensor 102 can be aligned against the surface 504. Such alignment can be accomplished mechanically by panning the depth sensor 102, for example. According to another example, a plane can be fit through a point cloud and deviations of each pixel from the plane can be computed to align the depth sensor 102 to the surface 504.

The subsets of the depth images of the surface 504 can be captured at X steps, where X can be substantially any integer (e.g., X can be 10, etc.). Thus, the depth images can be captured by the depth sensor 102 at X different distances from the surface 504, where the moveable apparatus 514 can position the depth sensor 102 and the distance measurement device 506 at the X different distances from the surface 504. For example, a range of distances over which the steps can occur can be from 4 m to 50 cm; however, substantially any other range is intended to fall within the scope of the hereto appended claims.

According to an example, the moveable apparatus 514 can cause the depth sensor 102 and the distance measurement device 506 to move in equally sized steps (e.g., ½ meter steps). Pursuant to another example, the movable apparatus 514 can cause the depth sensor 102 and the distance measurement device 506 to move in progressively smaller steps as a distance to the surface 504 decreases (e.g., each step can be 10% of a total distance to the surface 504). Employing progressively smaller steps can lead to a higher resolution sample data corpus, where a native resolution and accuracy of the depth sensor 102 are at highest, which can result in higher weights for samples at near range over samples taken at farther distances.

Accordingly, the calibration system 502 can obtain an array of error values (e.g., as computed by the error computation component 510) for a given pixel along with ground truth measurements of distances at which those errors were observed. As noted above, the calibration data generation component 512 can generate the depth calibration data 114 for the non-linear error model calibrated for the depth sensor 102 based upon the error values for the pixels at each of the respective distances from the surface 504 and the ground truth measurements. Various examples of the non-linear error model include a second degree polynomial, a trigonometric function (e.g., superposition of sinusoids, etc.), or the like.

According to an example, the non-linear error model can be a second-degree polynomial such as: Error=$Ax^2+Bx+C$. In the foregoing, x is a depth value for a given pixel, and A, B, and C are error fitting parameters (e.g., a portion of the depth calibration data 114) for the given pixel. The error fitting parameters can be unique for the depth sensor 102, yet the non-linear error model can be similar across other depth sensors of the same type. Following this example, the calibration data generation component 512 can fit the second-degree polynomial (e.g., using regression) to the error values to generate the depth calibration data 114 (e.g., the error fitting parameters of a parameter matrix). Accordingly, the depth calibration data 114 can be used at runtime to compute an expected error bias (e.g., per-pixel correction value) for a pixel given its coordinates on a depth image and the distance reported by the pixel.

It is contemplated that various analytical forms and degrees of non-linear error models are intended to fall within the scope of the hereto appended claims. For example, an analytical form and degree of a non-linear error function approximating the error of the depth sensor 102 can be explicitly determined (e.g., by knowing underlying characteristics of the depth sensor 102 and physical processes). According to yet another example, an analytical forms and degree of the non-linear error function can be detected manually (e.g., by analyzing a model and/or discovering the model). Pursuant to yet another example, an analytical form and degree of the non-linear error function can be automatically determined by employing an algorithm to analyze a range of analytical function forms for regression and/or using neural net/SVM (support vector machine) regression.

Figure 6:
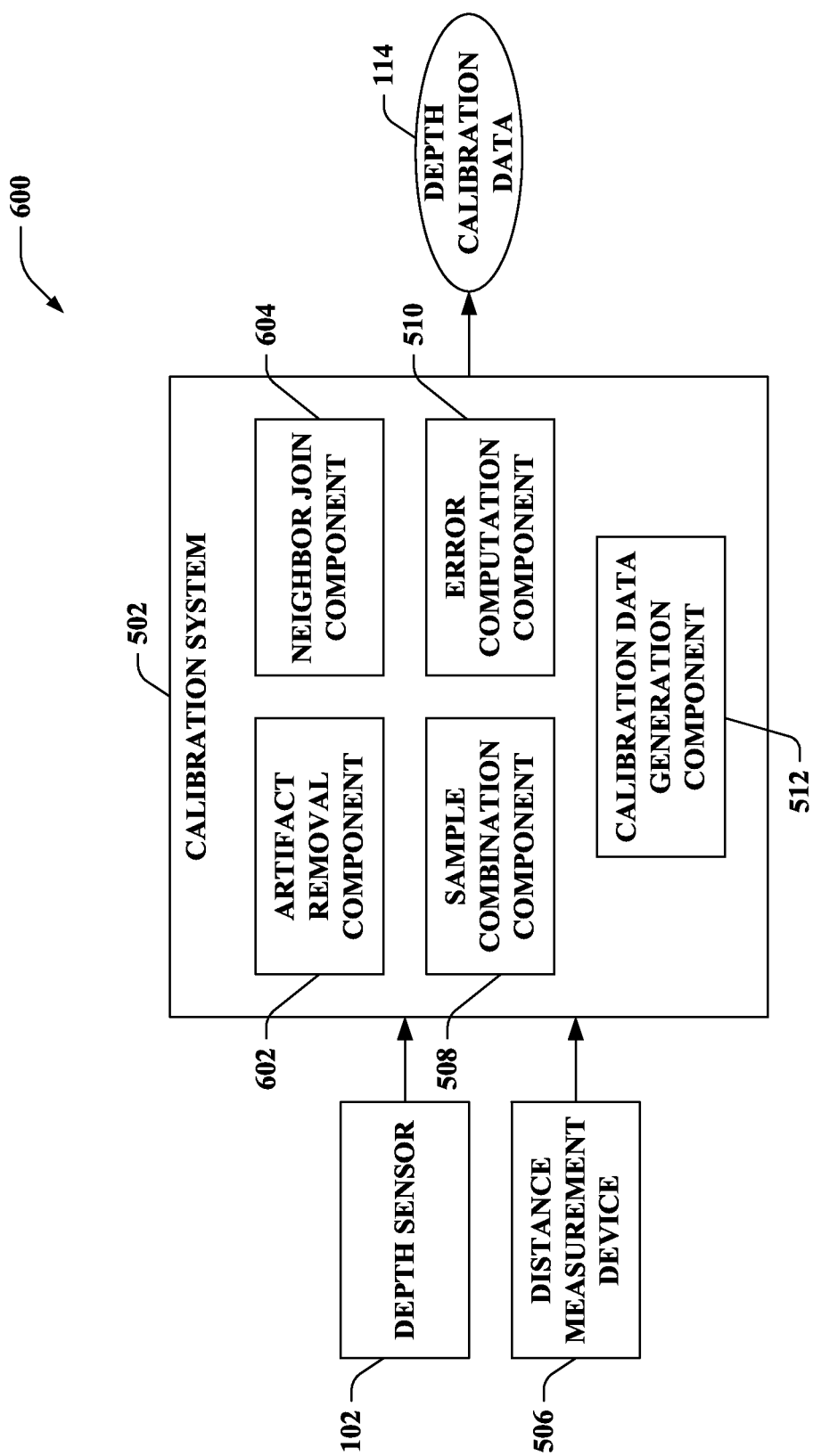
FIG. 6 illustrates a functional block diagram of another exemplary system that calibrates the depth sensor.

With reference to FIG. 6, illustrated is another exemplary system 600 that calibrates the depth sensor 102. Again, the system 600 includes the calibration system 502, which can further include the sample combination component 508, the error computation component 510, and the calibration data generation component 512. The calibration system 502 generates the depth calibration data 114 for the depth sensor 102 from the depth images of a surface (e.g., the surface 504 of FIG. 5, etc.) captured by the depth sensor 102 and corresponding ground truth measurements to the surface measured by the distance measurement device 506.

Some depth sensors can generate artifacts in depth images provided to the calibration system 502. For instance, the depth sensor 102 can generate vertical bands, which are artifacts similar to vertical columns on the depth images. The vertical bands can vary in location over time within depth images captured by the depth sensor 102. Further, the vertical bands can be unable to be controlled.

The calibration system 502 can include an artifact removal component 602. Prior to the sample combination component 508 averaging the depth values of the pixels over the depth images in each of the subsets captured at the respective distances from the surface, the artifact removal component 602, for each of the depth images of the surface captured by the depth sensor 102, can detect the vertical bands in the depth image. Moreover, the artifact removal component 602 can determine respective shift values in the depth values for the vertical bands in the depth image. Further, the artifact removal component can remove the shift values from the corresponding depth values in the depth image.

The vertical bands can be removed by the artifact removal component 602 from the depth images before samples are recorded since the position and amplitude of the vertical bands varies with time and distance. If the vertical bands were to not be removed, the depth calibration data 114 would have a short lifespan, which can be out of date on the order of minutes, thereby leading to frequent recalibration of the depth sensor 102. It is to be appreciated, however, that the vertical bands may be unable to be removed from the depth images captured by the depth sensor 102 at runtime (e.g., the vertical bands may be unable to be removed from the input depth image 106 received by the input component 110 of the depth correction system 104 of FIG. 1); yet, per-pixel correction can still be performed under such scenarios.

Figure 7:
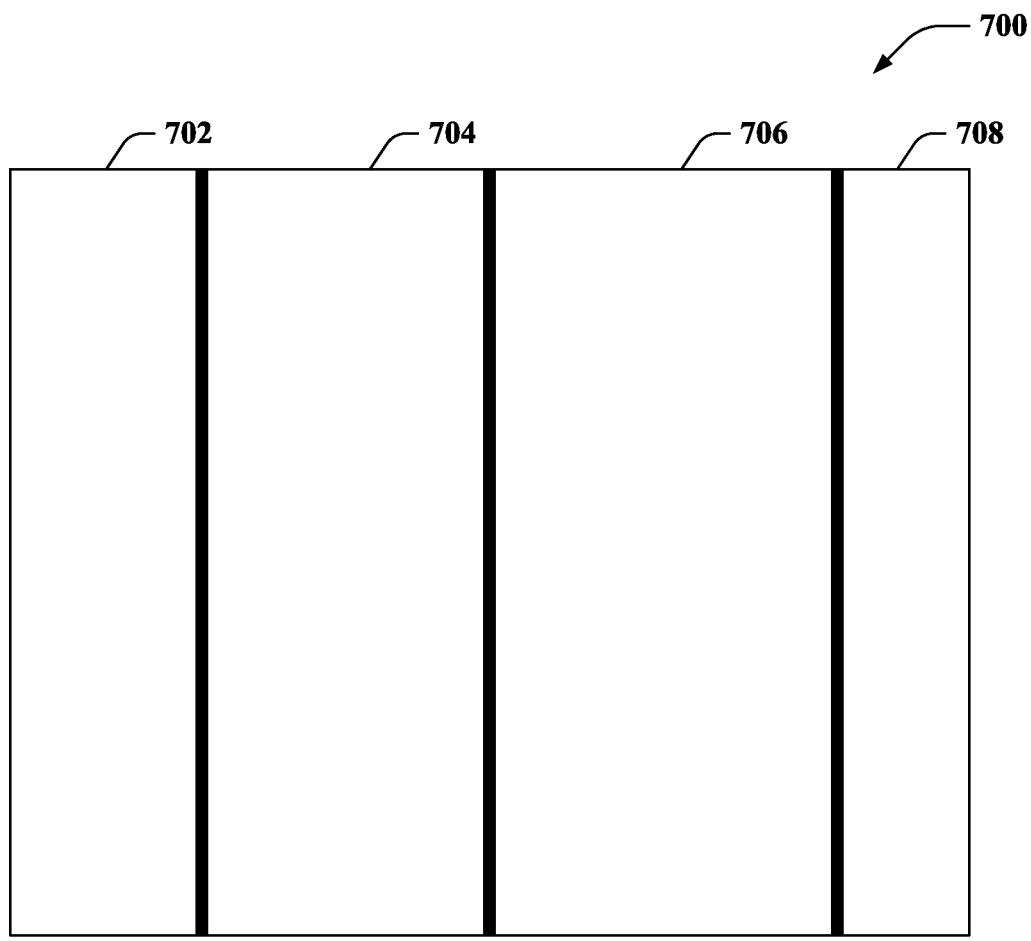
FIG. 7 illustrates an exemplary depth image that includes vertical bands.
Figure 7:
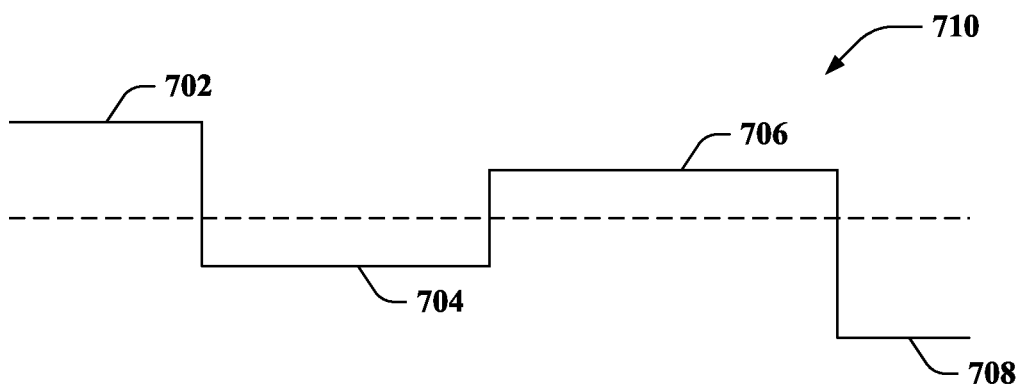

FIG. 7 illustrates an exemplary depth image 700 that includes vertical bands (e.g., a vertical band 702, a vertical band 704, a vertical band 706, and a vertical band 708). As shown in a depth profile 710 of the depth image 700, each of the vertical bands 702-708 are shifted either up or down from a collapsed value (e.g. represented by the dashed line). For instance, depth values of the pixels in the vertical band 702 can be shifted up by 15 millimeters, depth values of the pixels in the vertical band 704 can be shifted down by 5 millimeters, etc. However, it is also contemplated that one or more of the vertical bands need not be shifted from the collapsed value.

Columns of pixels that are included in vertical bands can change over time, a number of vertical bands can change over time, and an amount of the shift values can change over time. The artifact removal component 602 can detect the vertical bands 702-708 in the depth image 700, determine respective shift values for the vertical bands, and compensate the depth values in the depth image 700 by the respective shift values.

Again, reference is made to FIG. 6. The calibration system 502 can further include a neighbor join component 604. The neighbor join component 604 can compute averaged error values for patches of the pixels at each of the respective distances from the surface for the depth images of the surface captured by the depth sensor 102, where the patches include respective pluralities of the pixels. Moreover, the calibration data generation component 512 can generate respective subsets of the depth calibration data 114 for the patches based upon the averaged error values for the patches of the pixels at each of the respective distances from the surface and the ground truth measurements.

Noise levels from individual pixels, even after the sample combination component 508 averages depth values of the pixels across a number of depth images, can be high, resulting in depth calibration data 114 (e.g., per-pixel parameter matrix, etc.) that may suffer from excessive fitting noise, particularly when extrapolating beyond distances at which measurements are obtained. To compensate for pixel level noise, as well as to decrease a size of the depth calibration data 114 (e.g., decrease a size of the parameter matrix, etc.), the neighbor join component 604 can bin (e.g., bucketize) error values from neighboring pixels as part of patches. Thus, the calibration data generation component 512 can compute the fitting function for the patches. The patches can have an arbitrary shape (e.g., square, rectangular, other shape, etc.) as long as they represent an immediate local neighborhood of pixels. Pixels in a patch as defined by coordinates in the depth images can be set to share a common subset of the depth calibration data 114 (e.g., common set of correction parameters, common coefficients of a fitting polynomial, etc.).

According to an example, a size of a patch can be automatically detected by the neighbor join component 604. Following this example, the neighbor join component 604 can use a coarse to fine approach, where additional measurements are performed (e.g., autonomously by the movable apparatus 514 of FIG. 5) and correlations between patch size and noise levels and/or prediction quality improvement can be tested. However, it is to be appreciated that the claimed subject matter is not so limited.

Pursuant to various examples, patches can be 8 pixels by 8 pixels, 20 pixels by 20 pixels, etc. on a full resolution (e.g., 640×480) frame. It is to be appreciated that patch sizes smaller than 8×8 may be noisy and may exhibit overfitting artifacts (e.g., high variances) and patch sizes above 20×20 may not have enough resolution to suppress significant depth field distortions (e.g., high bias).

The depth calibration data 114, for instance, can include a parameter matrix. Accordingly, the parameter matrix can be a two-dimensional array that includes error fitting parameters per patch. Such an array can be a sparse array. Moreover, the parameter matrix can be resolution-agnostic, e.g. the size of each patch can be determined as a fraction of a frame resolution as opposed to a size measured in number of pixels. Thus, the width of a square patch can be $\frac{1}{40}$th of the width of the image frame and $\frac{1}{30}$th of the height of the image frame in a designated area of applicability (e.g., the patch can be applied to pixels in a given area of the field of view). The foregoing can provide flexibility (e.g., deriving the parameter matrix can be performed on a full resolution depth image captured by the depth sensor 102 to achieve a high quality parameter matrix but can be applied in a real-time scenario for a lower resolution depth image captured by the depth sensor 102 as determined by an underlying application).

Figure 8:
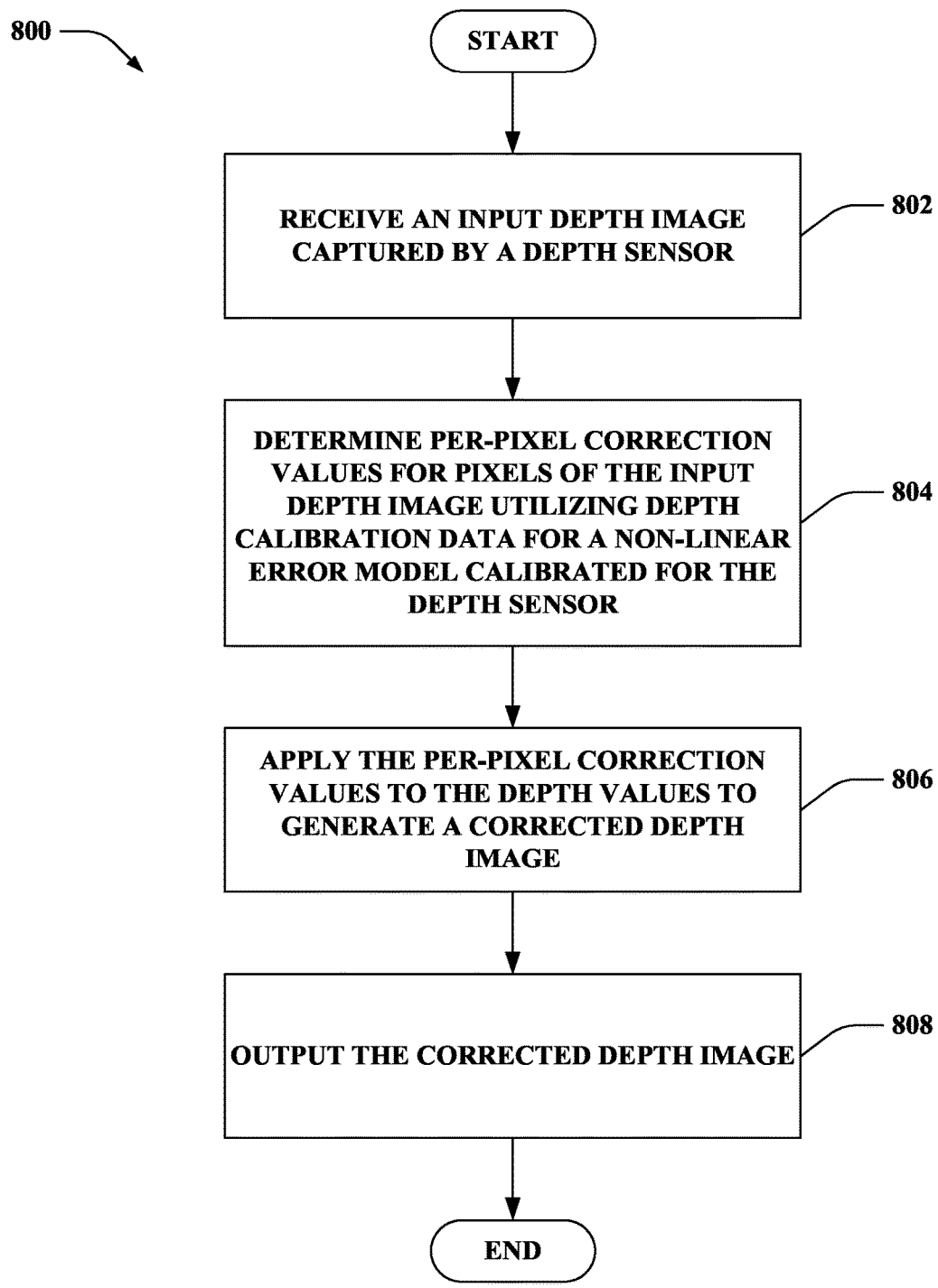
FIG. 8 is a flow diagram that illustrates an exemplary methodology of correcting an input depth image.
Figure 9:
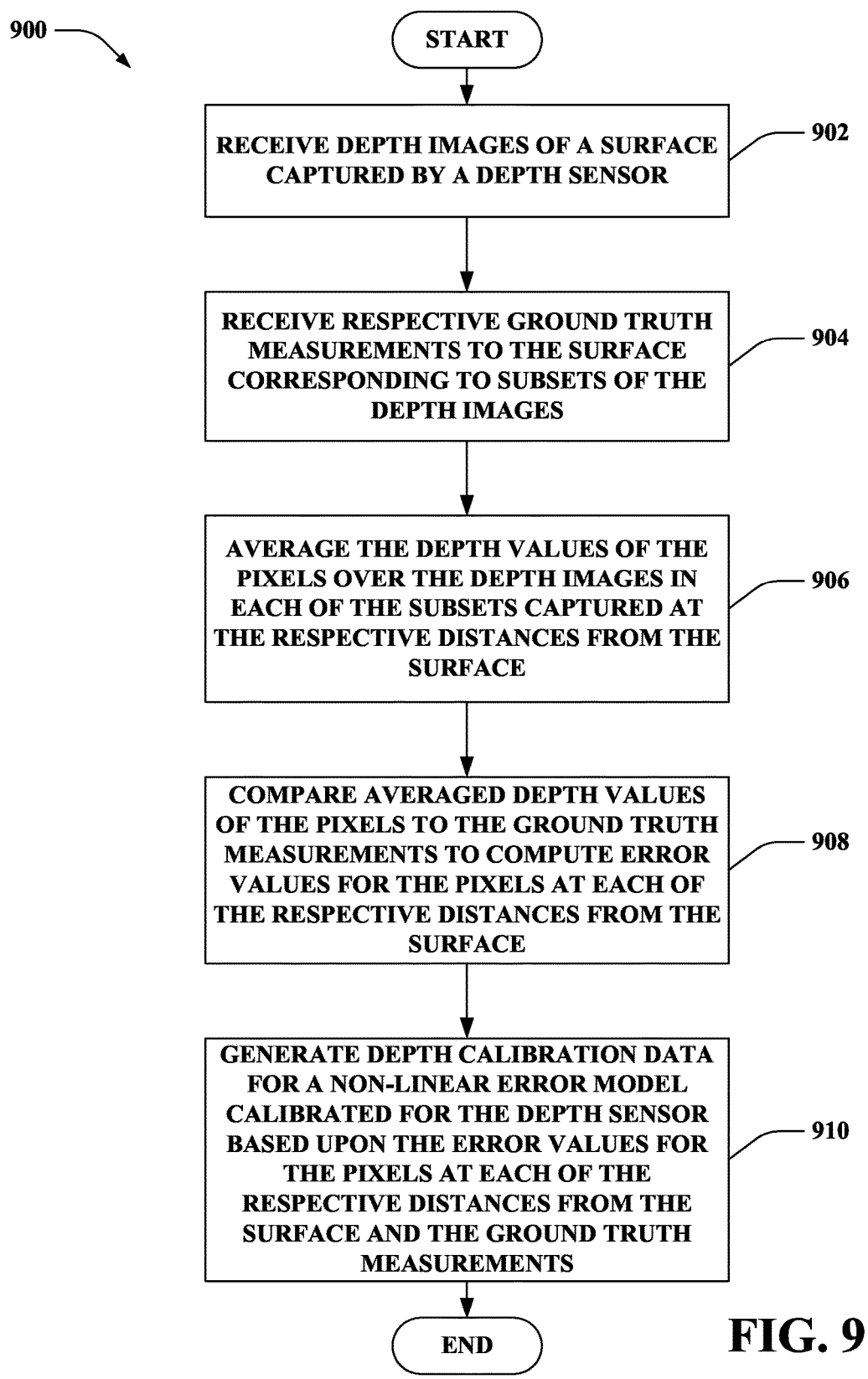
FIG. 9 is a flow diagram that illustrates an exemplary methodology of calibrating a depth sensor.

FIGS. 8-9 illustrate exemplary methodologies relating to calibrating a depth sensor and correcting depth images captured by the depth sensor. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 of correcting an input depth image. At 802, the input depth image captured by a depth sensor can be received. The input depth image can include pixels. Further, the pixels can have respective depth values in the input depth image. At 804, per-pixel correction values for the pixels can be determined utilizing depth calibration data for a non-linear error model calibrated for the depth sensor. The per-pixel correction values can be determined based on portions of the depth calibration data respectively corresponding to the pixels and the depth values. At 806, the per-pixel correction values can be applied to the depth values to generate a corrected depth image. At 808, the corrected depth image can be output.

With reference to FIG. 9, illustrated is a methodology 900 of calibrating a depth sensor. At 902, depth images of a surface captured by the depth sensor can be received. Subsets of the depth images of the surface can be captured at respective distances from the surface. The depth images can each include pixels, where the pixels can have respective depth values in each of the depth images. At 904, respective ground truth measurements to the surface corresponding to the subsets of the depth images can be received. The ground truth measurements can be measured by a distance measurement device. At 906, the depth values of the pixels can be averaged over the depth images in each of the subsets captured at the respective distances from the surface. At 908, averaged depth values of the pixels can be compared to the ground truth measurements to compute error values for the pixels at each of the respective distances from the surface. At 910, depth calibration data can be generated for a non-linear error model calibrated for the depth sensor based upon the error values for the pixels at each of the respective distances from the surface and the ground truth measurements.

Figure 10:
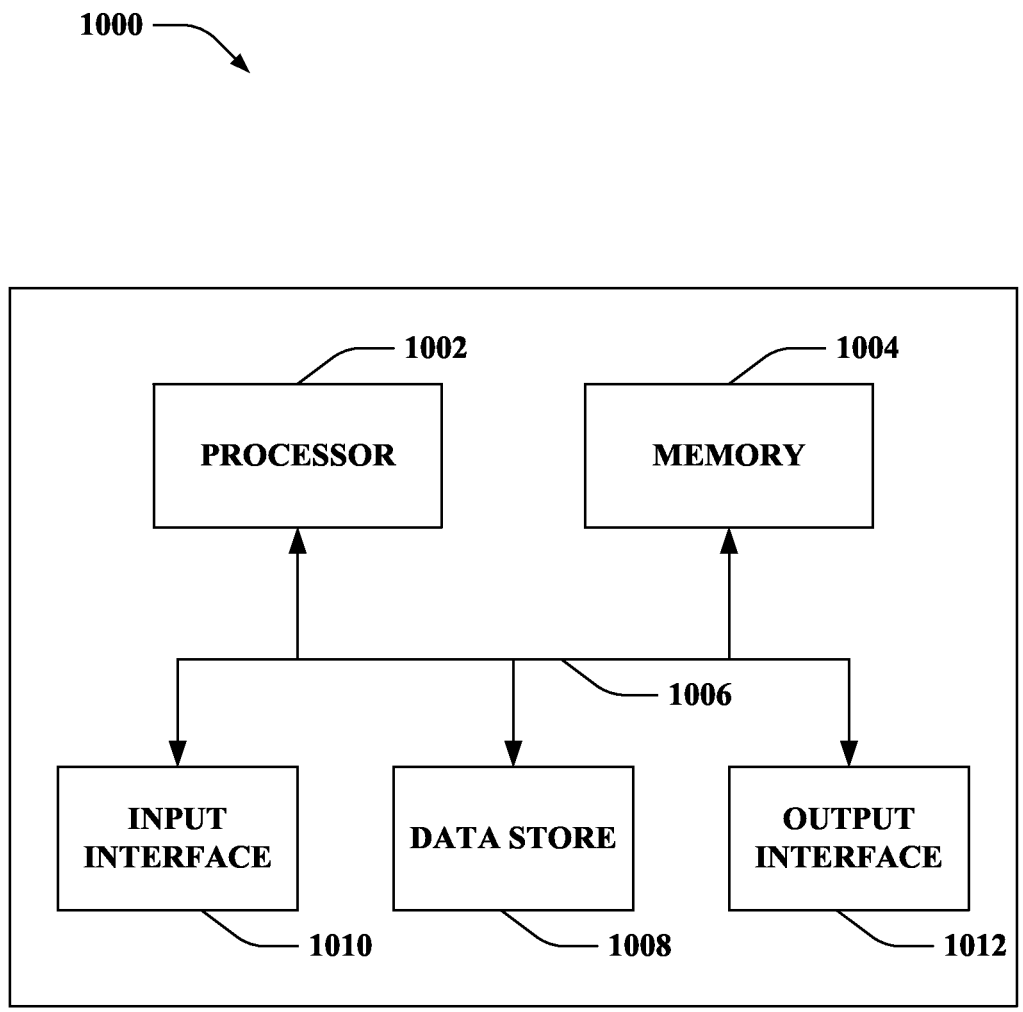
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be used in a system that performs per-pixel correction of an input depth image captured by a depth sensor to generate a corrected depth image. By way of another example, the computing device 1000 can be used in a system that calibrates depth sensor to generate depth calibration data. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store depth images, depth calibration data, ground truth measurements, averaged depth values of pixels at respective distances from a surface, and so forth.

The computing device 1000 additionally includes a data store 1008 that is accessible by the processor 1002 by way of the system bus 1006. The data store 1008 may include executable instructions, depth images, depth calibration data, ground truth measurements, averaged depth values of pixels at respective distances from a surface, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium.

Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of correcting an input depth image, comprising:
   receiving the input depth image captured by a depth sensor, wherein the input depth image comprises pixels, the pixels having respective depth values in the input depth image;
   determining per-pixel correction values for the pixels utilizing depth calibration data for a non-linear error model calibrated for the depth sensor, wherein the per-pixel correction values are determined based on portions of the depth calibration data respectively corresponding to the pixels and the depth values, and wherein the depth calibration data for the non-linear error model calibrated for the depth sensor is generated directly based on depth error values for the pixels and ground truth measurements;
   applying the per-pixel correction values to the depth values to generate a corrected depth image; and
   outputting the corrected depth image.

2. The method of claim 1, wherein the depth calibration data for the non-linear error model calibrated for the depth sensor comprises a parameter matrix, and wherein the parameter matrix comprises error fitting parameters for the pixels.

3. The method of claim 2, wherein determining the per-pixel correction values based on the portions of the depth calibration data respectively corresponding to the pixels and the depth values further comprises:
   for each of the pixels of the input depth image:
       retrieving error fitting parameters for a pixel from the parameter matrix, wherein the pixel has a depth value in the input depth image; and
       computing a per-pixel correction value for the pixel by evaluating a non-linear error function using the error fitting parameters for the pixel, wherein the non-linear error function is evaluated for the input depth image based on the depth value.

4. The method of claim 2, wherein the input depth image comprises a plurality of patches that comprise respective pluralities of the pixels of the input depth image, wherein the patches are assigned respective error fitting parameters of the parameter matrix, and wherein a plurality of the pixels included in a patch shares error fitting parameters assigned to the patch.

5. The method of claim 1, wherein the depth calibration data for the non-linear error model calibrated for the depth sensor comprises a lookup table, and wherein the lookup table comprises predefined correction values at preset depth values for the pixels.

6. The method of claim 5, wherein determining the per-pixel correction values based on the portions of the depth calibration data respectively corresponding to the pixels and the depth values further comprises:
   for each of the pixels of the input depth image:
       retrieving a first predefined correction value at a first preset depth value for a pixel from the lookup table, wherein the pixel has a depth value in the input depth image, and wherein the first preset depth value is equal to or immediately greater than the depth value for the pixel in the lookup table;
       retrieving a second predefined correction value at a second preset depth value for the pixel from the lookup table, wherein the second preset depth value is immediately less than the depth value for the pixel in the lookup table; and
       determining a per-pixel correction value for the pixel having the depth value based upon linear interpolation between the first predefined correction value at the first preset depth value and the second predefined correction value at the second preset depth value.

7. The method of claim 1, further comprising:
   identifying pluralities of the pixels of the input depth image that form respective patches, wherein the patches are assigned respective subsets of the depth calibration data, and wherein a plurality of the pixels included in a patch shares a subset of the depth calibration data.

8. The method of claim 7, wherein each of the patches is a preset fraction of the input depth image, the preset fraction of the input depth image being independent of a resolution of the input depth image captured by the depth sensor.

9. The method of claim 7, further comprising:
   responsive to applying the per-pixel correction values to the depth values, filtering the corrected depth image to smooth between the patches, wherein the corrected depth image as filtered is outputted.

10. The method of claim 1, wherein the corrected depth image is generated by the depth sensor.

11. The method of claim 1, further comprising generating the depth calibration data for the depth sensor from depth images of a surface captured by the depth sensor and corresponding ground truth measurements to the surface measured by a distance measurement device.

12. A system that corrects an input depth image, comprising:
   at least one processor; and
   memory that comprises computer-executable instructions that, when executed by the at least one processor, cause the at least one processor to perform acts including:

receiving the input depth image captured by a depth sensor, wherein the input depth image comprises pixels, the pixels having respective depth values in the input depth image;

determining per-pixel correction values for the pixels utilizing depth calibration data for a non-linear error model calibrated for the depth sensor, wherein determining the per-pixel correction values for the pixels further comprises:

identifying pluralities of the pixels of the input depth image that form respective patches;

wherein the patches are assigned respective subsets of the depth calibration data;

wherein a plurality of the pixels included in a patch shares a subset of the depth calibration data;

wherein the per-pixel correction values are determined based on the subsets of the depth calibration data respectively corresponding to the pixels and the depth values; and wherein the depth calibration data for the non-linear error model calibrated for the depth sensor is generated directly based on depth error values for the pixels and ground truth measurements;

applying the per-pixel correction values to the depth values to generate a corrected depth image; and outputting the corrected depth image.

13. The system of claim 12, wherein the depth calibration data for the non-linear error model calibrated for the depth sensor comprises a parameter matrix, and wherein the parameter matrix comprises error fitting parameters for the pixels.

14. The system of claim 12, wherein the depth calibration data for the non-linear error model calibrated for the depth sensor comprises a lookup table, and wherein the lookup table comprises predefined correction values at preset depth values for the pixels.

15. The system of claim 12, wherein each of the patches is a preset fraction of the input depth image, the preset fraction of the input depth image being independent of a resolution of the input depth image captured by the depth sensor.

16. The system of claim 12, the memory further comprises computer-executable instructions that, when executed by the at least one processor, cause the at least one processor to perform acts including:

filtering the corrected depth image to smooth between the patches.

17. A method of calibrating a depth sensor, comprising:

receiving depth images of a surface captured by the depth sensor, subsets of the depth images of the surface being captured at respective distances from the surface, the depth images each comprise pixels, the pixels having respective depth values in each of the depth images;

receiving respective ground truth measurements to the surface corresponding to the subsets of the depth images, the ground truth measurements being measured by a distance measurement device;

averaging the depth values of the pixels over the depth images in each of the subsets captured at the respective distances from the surface;

comparing averaged depth values of the pixels to the ground truth measurements to compute error values for the pixels at each of the respective distances from the surface; and generating depth calibration data for a non-linear error model calibrated for the depth sensor directly based upon the error values for the pixels at each of the respective distances from the surface and the ground truth measurements.

18. The method of claim 17, further comprising:

prior to averaging the depth values of the pixels over the depth images in each of the subsets captured at the respective distances from the surface, for each of the depth images of the surface captured by the depth sensor:

detecting vertical bands in a depth image;

determining respective shift values in the depth values for the vertical bands in the depth image; and removing the shift values from the corresponding depth values in the depth image.

19. The method of claim 17, further comprising:

computing averaged error values for patches of the pixels at each of the respective distances from the surface;

wherein the patches comprise respective pluralities of the pixels; and wherein respective subsets of the depth calibration data are generated for the patches based upon the averaged error values for the patches of the pixels at each of the respective distances from the surface and the ground truth measurements.

20. The method of claim 17, wherein the depth calibration data for the non-linear error model calibrated for the depth sensor comprises a parameter matrix, and wherein the parameter matrix comprises error fitting parameters for the pixels.

\* \* \* \* \*